(12) United States Patent
Zhang et al.

(10) Patent No.: US 10,880,684 B2
(45) Date of Patent: Dec. 29, 2020

(54) INFORMATION PRESENTATION APPARATUS, INFORMATION PRESENTATION SYSTEM, AND NON-TRANSITORY COMPUTER READABLE MEDIUM

(71) Applicant: FUJI XEROX CO., LTD., Tokyo (JP)

(72) Inventors: Yifan Zhang, Kanagawa (JP); Tohru Fuse, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/946,127

(22) Filed: Apr. 5, 2018

(65) Prior Publication Data

US 2019/0037347 A1    Jan. 31, 2019

(30) Foreign Application Priority Data

Jul. 31, 2017    (JP) .................................. 2017-147764

(51) Int. Cl.
*H04W 4/02*    (2018.01)
*G06F 3/12*    (2006.01)
*G06Q 10/00*    (2012.01)

(52) U.S. Cl.
CPC .......... *H04W 4/023* (2013.01); *G06F 3/1203* (2013.01); *G06F 3/1204* (2013.01); *G06F 3/1226* (2013.01); *G06F 3/1261* (2013.01); *G06F 3/1285* (2013.01); *G06F 3/1286* (2013.01); *G06F 3/1292* (2013.01); *G06Q 10/00* (2013.01)

(58) Field of Classification Search
CPC .... G06F 3/1226; G06F 3/1291; G06F 3/1292; G06F 3/1286; G06F 3/1285; G06F 3/1287; G06F 3/1261; G06F 3/1253; G06F 3/1203; G06F 3/1204; H04W 4/023; G06Q 10/00
USPC ............... 358/1.9, 2.1, 1.11–1.18, 400–404; 709/201–203
See application file for complete search history.

(56) References Cited

U.S. PATENT DOCUMENTS

| 6,421,716 B1 * | 7/2002 | Eldridge | G06F 16/93 709/219 |
| 7,419,095 B2 | 9/2008 | Yoshioka et al. | |
| 8,854,669 B1 * | 10/2014 | Jazayeri | G06F 3/1204 358/1.15 |
| 2004/0203931 A1 * | 10/2004 | Karaoguz | G01S 13/878 455/457 |

(Continued)

FOREIGN PATENT DOCUMENTS

JP    4034812 B2    1/2008

*Primary Examiner* — Chad Dickerson
(74) *Attorney, Agent, or Firm* — Oliff PLC

(57) ABSTRACT

An information presentation apparatus includes an acquiring unit and a presentation unit. The acquiring unit acquires information about a function group desired by a user. The function group includes at least one type of function. The presentation unit presents at least one candidate of at least one function providing location with a move sequence. The at least one function providing location is capable of providing, in combination, the at least one type of function of the function group acquired by the acquiring unit. The at least one function providing location is among multiple function providing locations which are present within an area predetermined with respect to a position of the user. Each of the multiple function providing locations is capable of providing at least one type of function among multiple types of functions.

19 Claims, 18 Drawing Sheets

(56) References Cited

U.S. PATENT DOCUMENTS

| | | | |
|---|---|---|---|
| 2008/0243379 A1* | 10/2008 | Pearce | G01C 21/00 701/434 |
| 2009/0105934 A1* | 4/2009 | Tajima | G01C 21/3617 701/118 |
| 2012/0019867 A1* | 1/2012 | Prati | G06F 3/1204 358/1.15 |
| 2012/0072376 A1* | 3/2012 | Akiyama | G06Q 30/0283 705/400 |
| 2012/0075672 A1* | 3/2012 | Oishi | G06F 3/1204 358/1.15 |
| 2017/0228198 A1* | 8/2017 | Koormamtharayil | G06F 3/126 |
| 2017/0329562 A1* | 11/2017 | Ozawa | H04N 1/00954 |

* cited by examiner

DESIRED FUNCTION GROUP S: WIRELESS LAN, PRINTER
CURRENT LOCATION: N

MOVE-DESTINATION CANDIDATE 1: FUNCTION: WIRELESS LAN [B], PRINTER [B]
MOVE: R[N, B]
MOVE-DESTINATION CANDIDATE 2: FUNCTION: WIRELESS LAN [C], PRINTER [C]
MOVE: R[N, C]
MOVE-DESTINATION CANDIDATE 3: FUNCTION: WIRELESS LAN [E], PRINTER [E]
MOVE: R[N, E]

DESIRED FUNCTION GROUP S: WIRELESS LAN, PRINTER, LUNCH
CURRENT LOCATION: N

DESIRED FUNCTION GROUP S: LUNCH, PROJECTOR, MEETING ROOM, WIRELESS LAN
CURRENT LOCATION: N
INDEPENDENT FUNCTION GROUP S: LUNCH, WIRELESS LAN
DEPENDENT FUNCTION GROUP S': GROUP [PROJECTOR, MEETING ROOM]

FIG. 12

FUNCTION FEATURE-VALUE TABLE

| LOCATION PROVIDING FUNCTION S1 | F1 FEE | F2 RELIABILITY | F3 QUANTITY | ... | Fn AREA | F_SUM |
|---|---|---|---|---|---|---|
| A | | | | | | |
| B | | | | | | |
| C | | | | | | |
| ... | | | | | | |

| LOCATION PROVIDING FUNCTION S2 | F1 FEE | F2 RELIABILITY | F3 QUANTITY | ... | Fn AREA | F_SUM |
|---|---|---|---|---|---|---|
| A | | | | | | |
| B | | | | | | |
| ... | | | | | | |

| LOCATION PROVIDING FUNCTION Sn | F1 FEE | F2 RELIABILITY | F3 QUANTITY | ... | Fn AREA | F_SUM |
|---|---|---|---|---|---|---|
| C | | | | | | |
| ... | | | | | | |

$$F\_SUM[S1[A]] = \sum_{k=1}^{n} F_k[S1[A]] * W(F_k)$$

FIG. 13A
MOVE FEATURE-VALUE TABLE

| MOVE | f1 DISTANCE | f2 CONGESTION FACTOR | f3 THE NUMBER OF STAIRS | ... | fn TIME | f_SUM |
|---|---|---|---|---|---|---|
| R[A, B] | | | | | | |
| R[A, C] | | | | | | |
| R[B, C] | | | | | | |
| ... | | | | | | |

$$f\_SUM(R[A, B]) = \sum_{k=1}^{n} f_k[R[A, B]] * W(f_k)$$

FIG. 13B
FEATURE WEIGHT TABLE

| FEATURE | W(f) or W(F) |
|---|---|
| f1 | |
| f2 | |
| f3 | |
| ... | |
| fn | |
| F1 | |
| F2 | |
| F3 | |
| ... | |
| FN | |

$$\sum_{k=1}^{n} f_k = 1$$

$$\sum_{k=1}^{n} F_k = 1$$

FIG. 13C
FEATURE-VALUE CONVERSION TABLE (EXAMPLE OF DISTANCE)

| ACTUAL VALUE | f1 (DISTANCE) |
|---|---|
| > 1000 m | 0 |
| 600 m TO 1000 m | 0.2 |
| 400 m TO 600 m | 0.4 |
| 300 m TO 400 m | 0.6 |
| 100 m TO 300 m | 0.8 |
| 0 m TO 100 m | 1.0 |

| Schedule | | |
|---|---|---|
| TASK | LOCATION | DURATION |
| SPEECH | H | 13:00 TO 14:00 |
| STUDY | | 15:00 TO 16:00 |
| SPORTS | G | 17:30 TO 18:30 |

| Schedule | | | PREVIOUS ASSOCIATED FUNCTION | | SYNCHRONOUS ASSOCIATED FUNCTION | | POST-ASSOCIATED FUNCTION | |
|---|---|---|---|---|---|---|---|---|
| TASK | LOCATION | DURATION | FUNCTION | SCHEDULED START TIME | FUNCTION | SCHEDULED START TIME | FUNCTION | SCHEDULED START TIME |
| SPEECH | H | 13:00 TO 14:00 | PRINTER [A] | | | | | |
| STUDY | | 15:00 TO 16:00 | | | PRIVATE ROOM [C] | | | |
| SPORTS | G | 17:30 TO 18:30 | | | | | SHOWER [B] | |

FIG. 18A

| MOVE | R[N, A] | R[A, H] | R[H, C] | R[C, G] | R[G, B] |
|---|---|---|---|---|---|
| TRAVEL TIME | 8 mins | 10 mins | 5 mins | 12 mins | 7 mins |

FIG. 18B

| FUNCTION | PRINTER [A] | PRIVATE ROOM [C] | SHOWER [B] |
|---|---|---|---|
| TIME IN USE | | 60 mins | |

FIG. 18C

| FUNCTION | PRINTER [A] | PRIVATE ROOM [C] | SHOWER [B] |
|---|---|---|---|
| TIME IN USE | 10 mins | 60 mins | 40 mins |

FIG. 18D

| Schedule | | | PREVIOUS ASSOCIATED FUNCTION | | SYNCHRONOUS ASSOCIATED FUNCTION | | POST-ASSOCIATED FUNCTION | |
|---|---|---|---|---|---|---|---|---|
| TASK | LOCATION | DURATION | FUNCTION | SCHEDULED START TIME | FUNCTION | SCHEDULED START TIME | FUNCTION | SCHEDULED START TIME |
| SPEECH | H | 13:00 TO 14:00 | PRINTER [A] | 12:40 | | | | |
| STUDY | | 15:00 TO 16:00 | | | PRIVATE ROOM [C] | 15:00 | | |
| SPORTS | G | 17:30 TO 18:30 | | | | | SHOWER [B] | 24:00 |

FIG. 18E

| FUNCTION | PRINTER [A] | PRIVATE ROOM [C] | SHOWER [B] | SPEECH [H] | SPORTS [G] |
|---|---|---|---|---|---|
| ARRIVAL TIME | 12:38 | 14:05 | 18:37 | 12:58 | 16:12 |

INFORMATION PRESENTATION APPARATUS, INFORMATION PRESENTATION SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-147764 filed Jul. 31, 2017.

BACKGROUND

Technical Field

The present invention relates to an information presentation apparatus, an information presentation system, and a non-transitory computer readable medium.

SUMMARY

According to an aspect of the invention, there is provided an information presentation apparatus including an acquiring unit and a presentation unit. The acquiring unit acquires information about a function group desired by a user. The function group includes at least one type of function. The presentation unit presents, with a move sequence, at least one candidate of at least one function providing location. The at least one function providing location is capable of providing, in combination, the at least one type of function of the function group acquired by the acquiring unit. The at least one function providing location is among multiple function providing locations which are present within an area predetermined with respect to a position of the user. Each of the multiple function providing locations is capable of providing at least one type of function among multiple types of functions.

BRIEF DESCRIPTION OF THE DRAWINGS

Exemplary embodiments of the present invention will be described in detail based on the following figures, wherein:

FIG. 12 is a diagram illustrating exemplary function feature-value tables;

FIG. 13A is a diagram illustrating an exemplary move feature-value table;

FIG. 13B is a diagram illustrating an exemplary feature weight table;

FIG. 13C is a diagram illustrating an exemplary feature-value conversion table for converting a move feature value into a number between 0 and 1;

FIG. 18A is a diagram illustrating an exemplary result of acquisition of travel times;

FIG. 18B is a diagram illustrating an example of the time in use of a synchronous associated function;

FIG. 18C is a diagram illustrating an example in which, in addition to the synchronous associated function, the time in use of a previous associated function and the time in use of a post-associated function are set;

FIG. 18D is a diagram illustrating an example in which the scheduled start time T' of each associated function is set; and FIG. 18E is a diagram illustrating exemplary arrival times.

DETAILED DESCRIPTION

Figure 1:
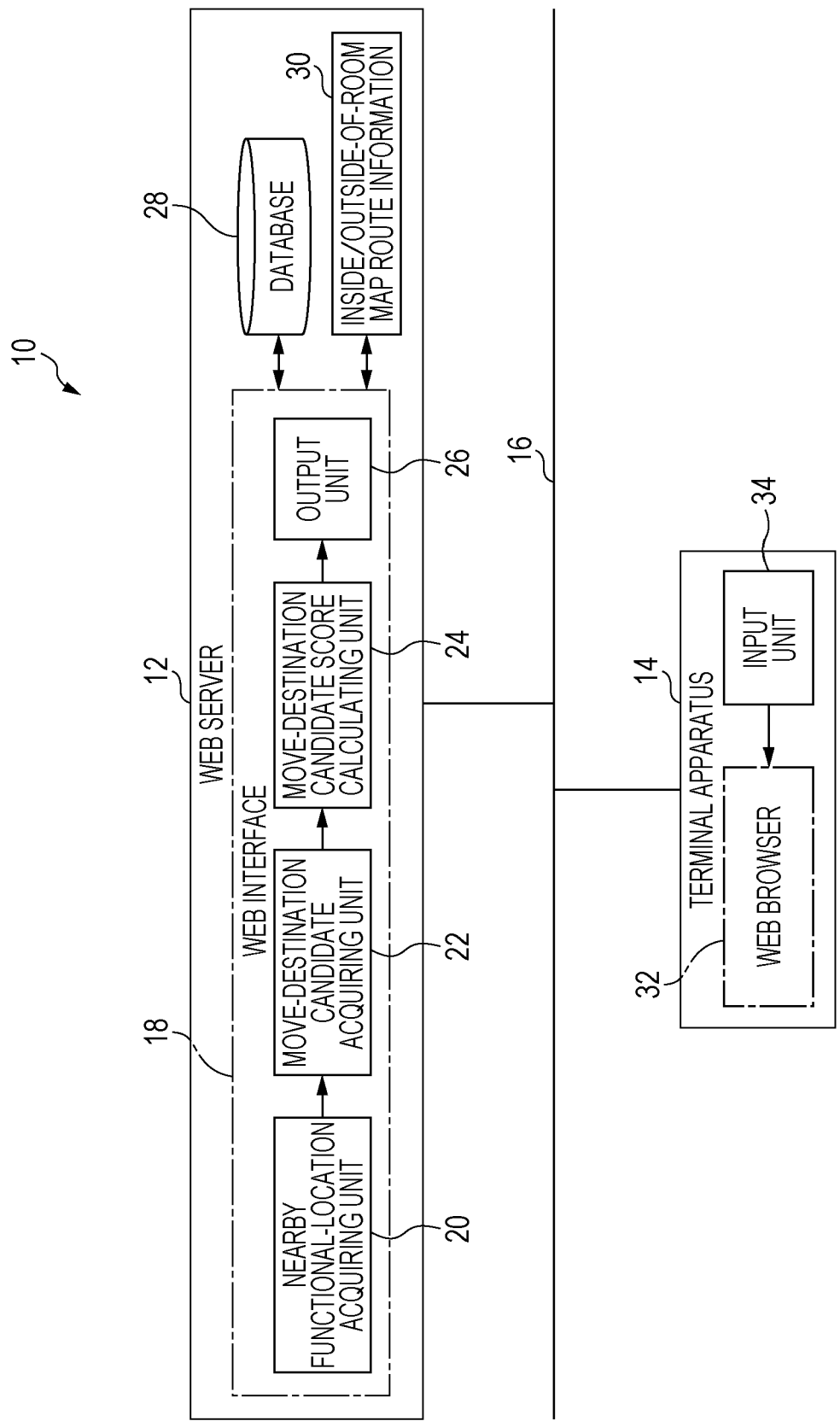
FIG. 1 is a block diagram illustrating a schematic configuration of an information presentation system according to an exemplary embodiment.

Exemplary embodiments of the present invention will be described in detail below by referring to the drawings. FIG.

1 is a block diagram illustrating the schematic configuration of an information presentation system 10 according to an exemplary embodiment.

In response to a user request, the information presentation system 10 according to the exemplary embodiment presents function providing locations that provide available functions in an area predetermined with respect to the current location. In the exemplary embodiment, a function indicates a service, which may be provided to a user, or an object for providing a service. Specifically, examples of a function include a meeting room, a printer, a wireless local-area network (LAN), and a lunch. In the exemplary embodiment, a function providing location indicates a location which may provide a function described above.

As illustrated in FIG. 1, the information presentation system 10 according to the exemplary embodiment includes a web server 12 and a terminal apparatus 14 which are connected to a communications network 16 such as a network. FIG. 1 illustrates an example in which the single terminal apparatus 14 is connected to the communications network 16. However, this is not limiting. Multiple terminal apparatuses 14 may be connected to the communications network 16.

The web server 12 is formed, for example, of a computer including a central processing unit (CPU), a read only memory (ROM), and a random access memory (RAM). The web server 12 includes a database 28 for searching for move-destination candidates for a user. The database 28 stores, for example, information about the types of functions provided at function providing locations, each of which provides at least one type of function, and information about the positions of the function providing locations. The database 28 also stores information about various tables (such as function feature-value tables, a move feature-value table, a feature weight table, and feature-value conversion tables) described below.

The terminal apparatus 14 is formed of a computer including a CPU, a ROM, a RAM, and an input unit 34. As the terminal apparatus 14, for example, a portable terminal apparatus such as a smartphone may be used, or a personal computer or the like may be used.

In the exemplary embodiment, the terminal apparatus 14 executes programs stored in the ROM. Thus, the terminal apparatus 14 functions as a web browser 32 and requests the web server 12 to search for function providing locations which may provide the functions of a function group (may be hereinafter referred to as a to-be-performed function group) desired by a user. In contrast, the web server 12 executes programs stored in the ROM so as to function as a web interface 18. In response to the request from the terminal apparatus 14, the web server 12 presents, to the terminal apparatus 14, function providing locations which may provide the functions of the to-be-performed function group.

The web browser 32 receives information about the to-be-performed function group including at least one type of function, through a user operation on the input unit 34, and transmits, to the web server 12, the received information about the function group. Thus, the web browser 32 requests the web server 12 to search for move-destination candidates.

In contrast, the web interface 18 searches, as move-destination candidates, for combinations of function providing locations from among multiple function providing locations which are present in the predetermined area and each of which may provide at least one type of function. Each combination may provide the functions of the to-be-performed function group to the user. Then, the web interface 18 transmits, for presentation to the user, information about the found move-destination candidates to the terminal apparatus 14. In the search for move-destination candidates, the searching may be performed not only by using information stored in the database 28, but also by using inside/outside-of-room map route information 30 that may be obtained, for example, from a server providing a destination guide site or the like.

Specifically, the web interface 18 is provided with the functions of a nearby functional-location acquiring unit 20, a move-destination candidate acquiring unit 22, a move-destination candidate score calculating unit 24, and an output unit 26.

Figure 2:
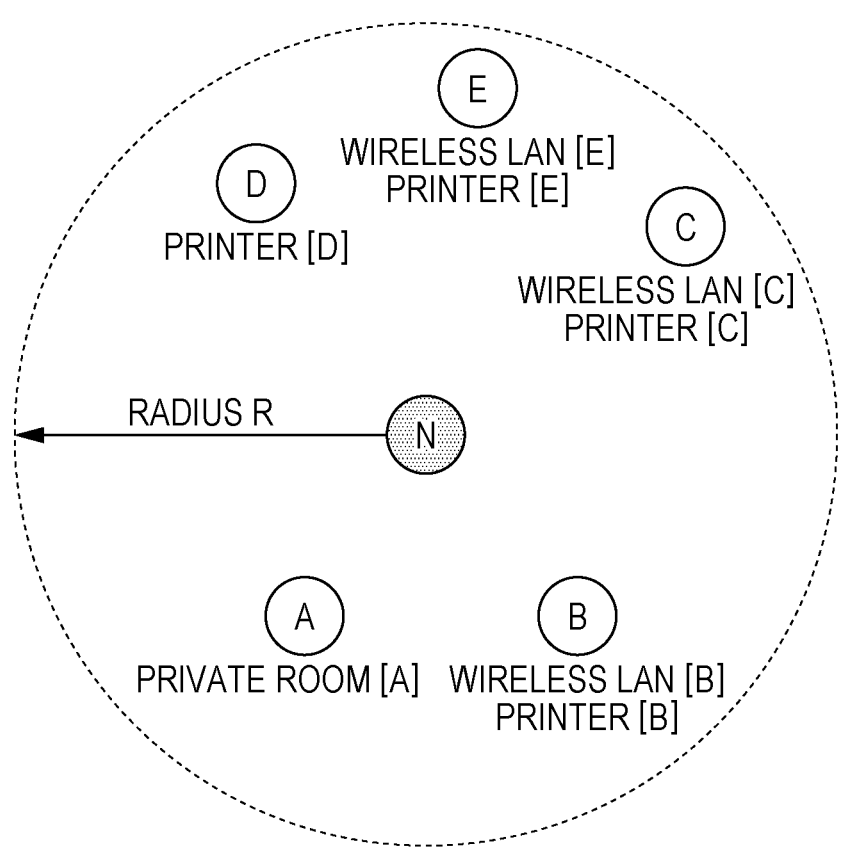
FIG. 2 is a diagram illustrating exemplary function providing locations A to E which are present within a radius R of a user.

The nearby functional-location acquiring unit 20 obtains position information of a user, and acquires, from the database 28, information about function providing locations which provide predetermined functions in the area predetermined with respect to the user position. For example, as illustrated in FIG. 2, information (the positions and the functions) about function providing locations A to E that present within a radius R of the user is obtained from the database 28. FIG. 2 illustrates an example in which the function providing location A provides a private room; the function providing location B provides a wireless LAN and a printer; the function providing location C provides a wireless LAN and a printer; the function providing location D provides a printer; and the function providing location E provides a wireless LAN and a printer. As the position information of a user, the position of the terminal apparatus 14 may be stored in advance in the database 28. Alternatively, in the case of the terminal apparatus 14 provided with a positioning function such as the function of a global positioning system (GPS), the position information may be obtained from the terminal apparatus 14. Alternatively, when the terminal apparatus 14 is to request the web server 12 to search for move-destination candidates, the terminal apparatus 14 may receive the position information of the terminal apparatus 14 by using the input unit 34.

From the acquired function providing locations, the move-destination candidate acquiring unit 22 acquires move-destination candidates, each of which includes function providing locations at which the functions requested by the user are performed.

For each of the acquired move-destination candidates, the move-destination candidate score calculating unit 24 calculates a score obtained by converting, into a number, the degree of appropriateness of the move-destination candidate, for example, on the basis of the feature values of the functions and the feature values of the moves. Thus, the move-destination candidate score calculating unit 24 ranks the move-destination candidates.

The output unit 26 transmits, to the terminal apparatus 14 which is the request source, the acquired move-destination candidates and their scores. At that time, only several top-ranked candidates of which the scores are high may be transmitted, or all of the move-destination candidates may be transmitted.

The terminal apparatus 14 displays, on the web browser 32, the move-destination candidates and their scores which are transmitted from the web interface 18. Thus, the terminal apparatus 14 presents the move-destination candidates and their scores to the user.

Figure 3:
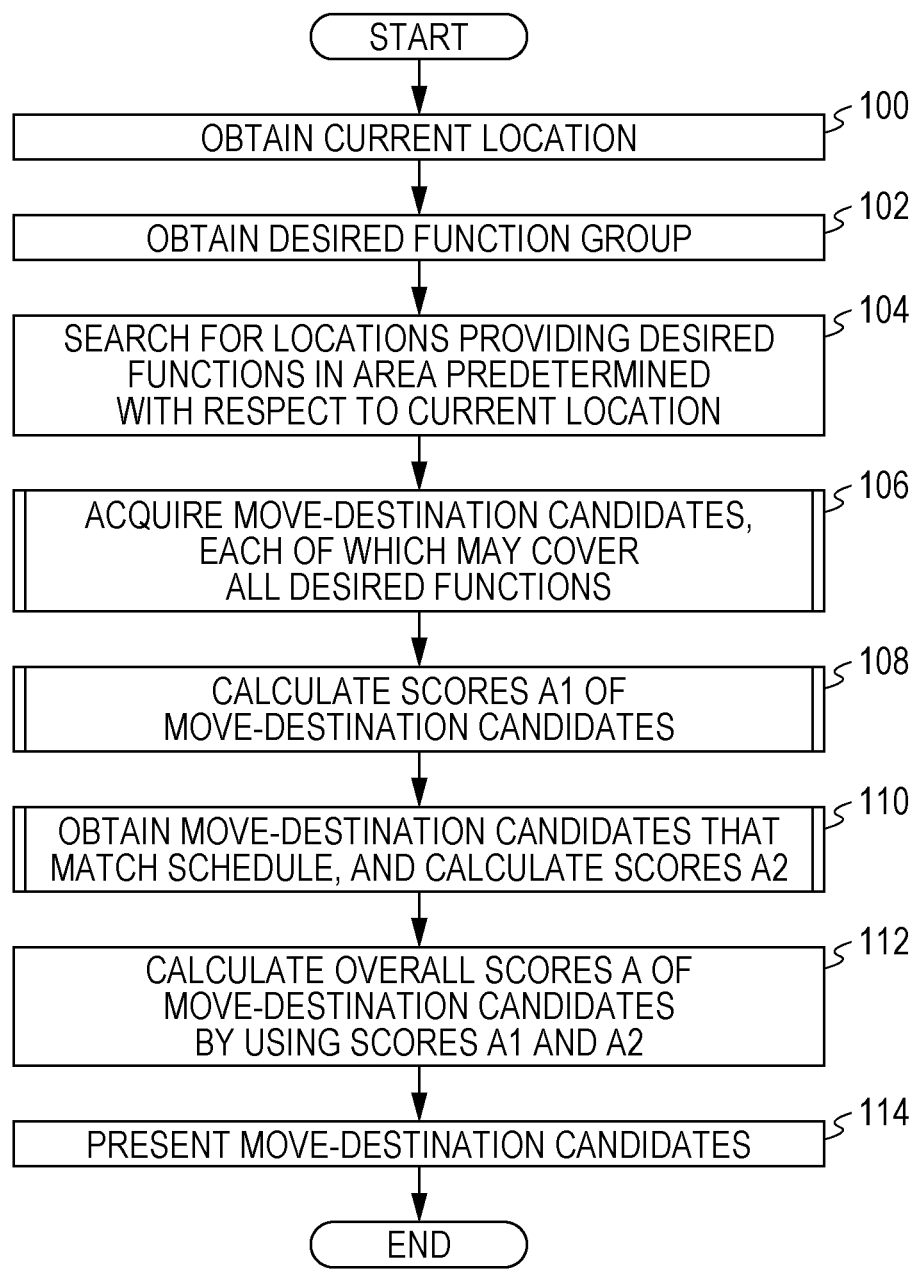
FIG. 3 is a flowchart of an exemplary process performed by a web interface of a web server of an information presentation system according to an exemplary embodiment.

A process, which is performed by the web server 12 of the information presentation system 10 according to the exemplary embodiment, of presenting move-destination candidates will be specifically described. FIG. 3 is a flowchart of an exemplary process performed by the web interface 18 of the web server 12 of the information presentation system 10 according to the exemplary embodiment. The process in FIG. 3 starts after a user operates the input unit 34 of the terminal apparatus 14 so that a request to search for move-destination candidates is transmitted to the web server 12.

The terminal apparatus 14 transmits a request to search for move-destination candidates. Then, in step 100, the web interface 18 obtains position information of the user, and the process proceeds to step 102. In the case where the terminal apparatus 14 is installed at a fixed position, its position information is registered in the database 28 in installation of the terminal apparatus 14. Thus, the registered position information may be read. In the case where the terminal apparatus 14 is provided with a positioning function, the position information obtained through positioning performed by the terminal apparatus 14 may be obtained through the communications network 16. In the case where, in transmission, from the terminal apparatus 14, of a request to search for move-destination candidates, the position information is input by using the input unit 34, the received position information may be obtained.

In step 102, the web interface 18 obtains a desired function group, and the process proceeds to step 104. For example, the desired function group is obtained in such a manner that functions received through the user's operation on the input unit 34 of the terminal apparatus 14 are obtained through the communications network 16. Step 102 corresponds to an acquiring unit provided in the exemplary embodiment of the present invention.

In step 104, the nearby functional-location acquiring unit 20 of the web interface 18 searches the database 28 for function providing locations that provide the functions, which are included in the desired function group, in the area predetermined with respect to the current location, and the process proceeds to step 106.

In step 106, the move-destination candidate acquiring unit 22 of the web interface 18 acquires move-destination candidates, each of which may cover all the desired functions, and the process proceeds to step 108. That is, function providing locations at which all the desired functions may be performed are obtained as a move-destination candidate in the area predetermined with respect to the current location. The process of obtaining move-destination candidates will be described below in detail.

In step 108, the move-destination candidate score calculating unit 24 of the web interface 18 calculates the scores A1 of the move-destination candidates, and the process proceeds to step 110. That is, for each of the acquired move-destination candidates, the feature values are converted into numbers, whereby a score A1 is calculated. The process of calculating the scores A1 of the move-destination candidates will be also described in detail below.

In step 110, the move-destination candidate score calculating unit 24 of the web interface 18 obtains move-destination candidates that match an action plan (hereinafter referred to as a schedule) of the user, and calculates the scores A2 of the obtained move-destination candidates. Then, the process proceeds to step 112. That is, for each of the acquired move-destination candidates, the match factor for the schedule is converted into a number, whereby a score A2 is calculated. The process of calculating scores A2 will be also described in detail below.

In step 112, the move-destination candidate score calculating unit 24 of the web interface 18 calculates the overall scores A of the move-destination candidates by using the calculated scores A1 and A2. Then, the process proceeds to step 114.

In step 114, the output unit 26 of the web interface 18 transmits, for presentation to the user, the move-destination candidates to the terminal apparatus 14. Then, the series of processes end. All the move-destination candidates obtained in step 106 may be presented with the calculated scores A. Alternatively, only top-ranked move-destination candidates of which the scores A fall within a predetermined range may be presented. Step 114 corresponds to a presentation unit according to the exemplary embodiment of the present invention.

Figure 4:
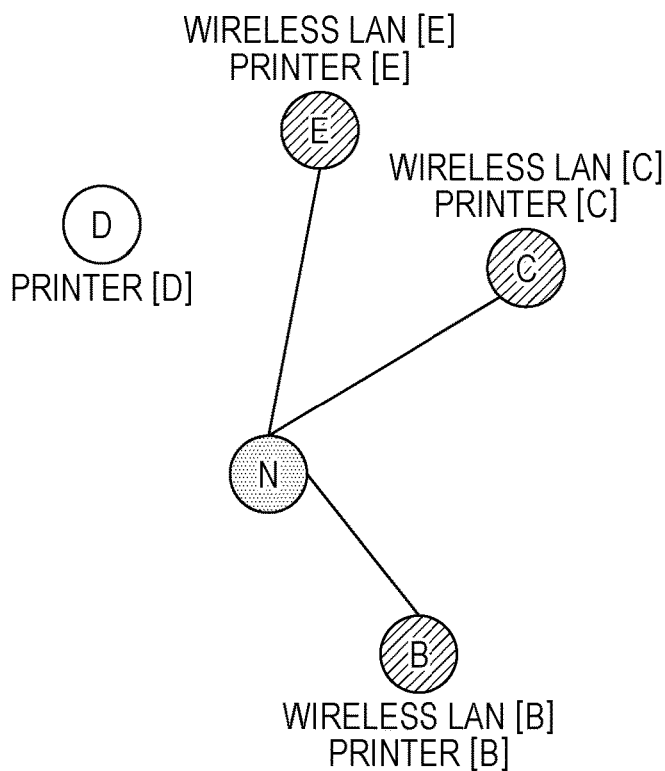
FIG. 4 is a diagram for describing a process of acquiring move-destination candidates in the case where desired functions may be used at a single location.

The process of obtaining move-destination candidates in step 106 described above will be described in detail. A desired function group may be used at a single move-destination candidate, or may be used through moving to multiple locations. In the case where a desired function group may be used at a single move-destination candidate, for example, as illustrated in FIG. 4, if the desired function group is constituted by the wireless LAN function and the printer function, the function processing units A to E which are present in the predetermined area are extracted, and move-destination candidates, each of which may provide all the functions, are obtained. In the example in FIG. 4, the function processing units B, C, and E are three move-destination candidates, each of which may provide the desired functions.

Figure 5:
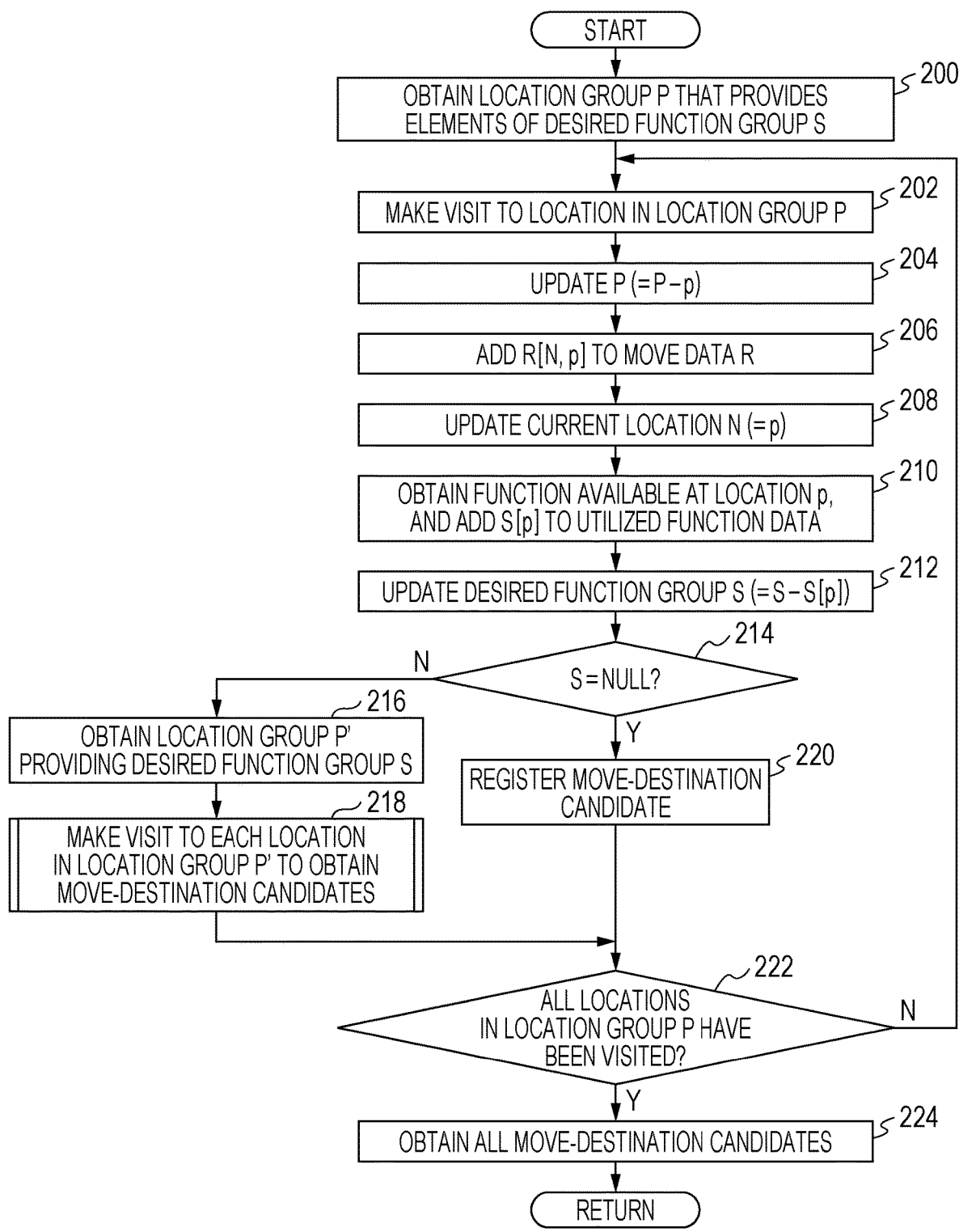
FIG. 5 is a flowchart of an exemplary process, which is performed by a web interface of a web server of an information presentation system, of obtaining move-destination candidates, each of which may cover all desired functions, according to an exemplary embodiment.

In the case where the desired function group may be used through moving to multiple locations, the process in FIG. 5 is performed as the process in step 106. FIG. 5 is a flowchart of an exemplary process, which is performed by the web interface 18 of the web server 12 of the information presentation system 10 according to the exemplary embodiment, of obtaining move-destination candidates, each of which may cover all the desired functions.

That is, in step 200, the move-destination candidate acquiring unit 22 of the web interface 18 obtains, through searching the database 28, a location group P that provides the elements of the desired function group S. Then, the process proceeds to step 202. That is, the database 28 is searched for a location group P of function providing locations at which the functions of the desired function group S may be performed and which are present in the area (for example, within the radius R) predetermined with respect to the current location, and the location group P is obtained.

In step 202, the move-destination candidate acquiring unit 22 of the web interface 18 makes a visit to a location in the obtained location group P so as to search for move-destination candidates. Then, the process proceeds to step 204.

In step 204, the move-destination candidate acquiring unit 22 of the web interface 18 updates the location group P (=P−p), and the process proceeds to step 206. That is, the visited location is excluded from the location group P.

In step 206, the move-destination candidate acquiring unit 22 of the web interface 18 adds, to move data R, R[N, p] indicating a move from N to p, and the process proceeds to step 208.

In step 208, the move-destination candidate acquiring unit 22 of the web interface 18 updates the current location N (=p), and the process proceeds to step 210. That is, the current location is updated with the move destination p.

In step 210, the move-destination candidate acquiring unit 22 of the web interface 18 obtains, from the database 28, the function(s) available at the location p, and adds S[p] to the utilized function data. Then, the process proceeds to step 212.

In step 212, the move-destination candidate acquiring unit 22 of the web interface 18 updates the desired function group S (=S−S[p]), and the process proceeds to step 214. That is, the added utilized function S[p] is excluded from the to-be-found targets that are to be used in the search.

In step 214, the move-destination candidate acquiring unit 22 of the web interface 18 determines whether or not all elements in the desired function group S have been found. If the determination result is negative, the process proceeds to step 216. If the determination result is positive, the process proceeds to step 220.

In step 216, the move-destination candidate acquiring unit 22 of the web interface 18 obtains, from the database 28, the location group P' that provides the updated desired function group S, and the process proceeds to step 218.

In step 218, the move-destination candidate acquiring unit 22 of the web interface 18 makes a visit to each location in the remaining location group P' to obtain move-destination candidates, and the process proceeds to step 222. Processes similar to steps 202 to 216 described above are performed on the location group P'.

In contrast, in step 220, the move-destination candidate acquiring unit 22 of the web interface 18 registers the move-destination candidate, and the process proceeds to step 222.

In step 222, the move-destination candidate acquiring unit 22 of the web interface 18 determines whether or not all the locations in the location group P have been visited so as to obtain move sequences. If the determination result is negative, the process returns to step 202, and the above-described processes are repeatedly performed. If the determination result is positive, the process proceeds to step 224.

In step 224, the move-destination candidate acquiring unit 22 of the web interface 18 obtains all the move-destination candidates. The series of processes ends, and the process returns to step 108 in FIG. 3.

Figure 6:
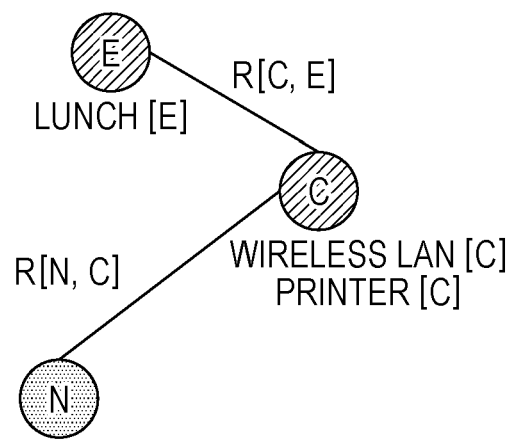
FIG. 6 is a diagram illustrating an example in which a location group P of function providing locations B, C, and E at which the functions of a desired function group S may be performed is obtained and in which a move to the function providing location E is made after a move to the function providing location C.

The process of obtaining move-destination candidates in FIG. 5 will be described in detail by taking a concrete example. For example, as illustrated in FIG. 6, assume that the desired function group S is constituted by the wireless LAN function, the printer function, and the lunch function. In this case, a location group P of function providing locations B, C, and E which are present in the area (for example, within the radius R) predetermined with respect to the current location N and at which the functions in the desired function group S may be performed is obtained from the database 28.

At that time, for example, assume that a move to the function providing location C is made. The move to the function providing location C leads to updating the location group P, and the function providing locations B and E constitute the remaining location group P.

In addition, the move from the current location N to the function providing location C is made. Therefore, R[N, C] indicating a move from the current location to the function providing location C is added.

The move to the function providing location C leads to addition of the wireless LAN [C] and the printer [C] to the utilized function S[p]. Thus, the desired function group S is updated, and the remaining function group is constituted only by the lunch function.

The location group P' which provides a part of the desired function group S is constituted by the function providing locations B and E since the move to the function providing location C is first made among the obtained function providing locations B, C, and E.

Processes similar to the above-described processes are performed on the location group P'. For example, assume that, subsequent to the move to the function providing location C, a move to the function providing location E is made. The move to the function providing location E leads to updating the location group P', and the function providing location B constitutes the remaining location group.

The current location is moved from the function providing location C to the function providing location E. Therefore, R[C, E] indicating a move from the function providing location C to the function providing location E is added, and the move data includes R[N, C] and R[C, E].

The move to the function providing location E leads to addition of the lunch [E] to the utilized function S[p]. Thus, all of the functions in the desired function group S may be performed. Therefore, the desired function group S is updated, and the remaining desired function group S is not present (NULL). The determination result in step 214 is positive, and the move R[N, C] and the move R[C, E] are registered as the move-destination candidate 1.

Figure 7:
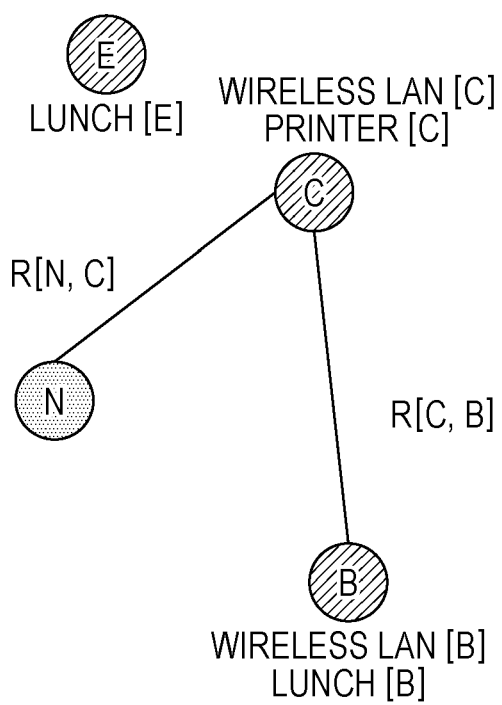
FIG. 7 is a diagram illustrating an example in which, in a location group P of function providing locations B, C, and E at which the functions of the desired function group S may be performed, a move to the function providing location B is made after a move to the function providing location C.

In contrast, the location group P' is still present (not NULL). Therefore, the location group P' is to be visited. For example, as illustrated in FIG. 7, assume that, subsequent to the move to the function providing location C, a move to the function providing location B is made. Thus, the function providing location B provides the desired function of lunch. Therefore, the location group P' is updated, and no other locations to move are present (P'=NULL).

Since the move from the current location C to the function providing location B is made, R[C, B] indicating a move from the function providing location C to the function providing location B is added. The move data includes R[N, C] and R[C, B].

The move to the function providing location B leads to addition of the lunch [B] to the utilized function S[p]. Thus, all of the desired functions may be performed. Therefore, the desired function group S is updated, and the remaining desired function group S is not present (NULL). The determination result in step 214 is positive, and the move R[N, C] and the move R[C, B] are registered as the move-destination candidate 2.

Thus, all elements in the location group P' have been visited (P'=NULL). The location group P is to be visited (for example, making visits in the case where a move to the function providing location E is first made, and making visits in the case where a move to the function providing location B is first made) as described above.

Another combination in the location group P is still present. Therefore, the above-described processes are repeatedly performed. For example, a move to the function providing location B is made, and the location group P is updated. Then, the location group P is constituted by the function providing locations C and E. At that time, the function providing location B provides the wireless LAN [B] and the lunch [B] in the desired function group S. Therefore, the remaining move target is the function providing location C which may provide the printer function. Thus, the moves R[N, B] and R[B, C] are registered as the move-destination candidate 3.

Figure 8:
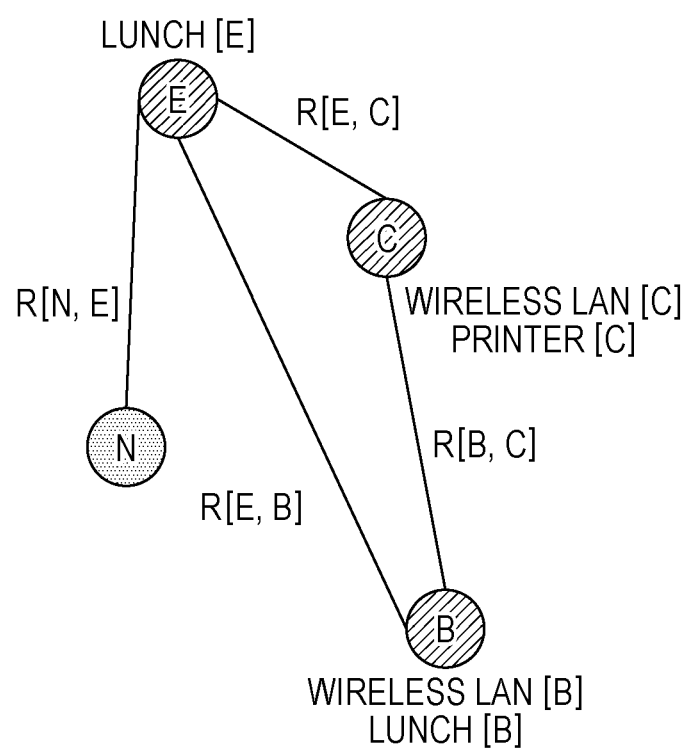
FIG. 8 is a diagram illustrating exemplary moves in other move-destination candidates in a location group P of function providing locations B, C, and E at which the functions of the desired function group S may be performed.

In the location group P, there is the case in which a move to the function providing location E is first made. As illustrated in FIG. 8, visits are made as described above for the case in which a move to the function providing location E is first made. Visits made when a move to the function providing location E is first made lead to updating the location group P, and the remaining location group P is not present (P=NULL). Visits made when a move to the function providing location E is first made lead to registration of the moves R[N, E], R[E, B], and R[B, C] as the move-destination candidate 4. The moves R[N, E] and R[E, C] are registered as the move-destination candidate 5. Thus, all of the move-destination candidates are registered.

Figure 9:
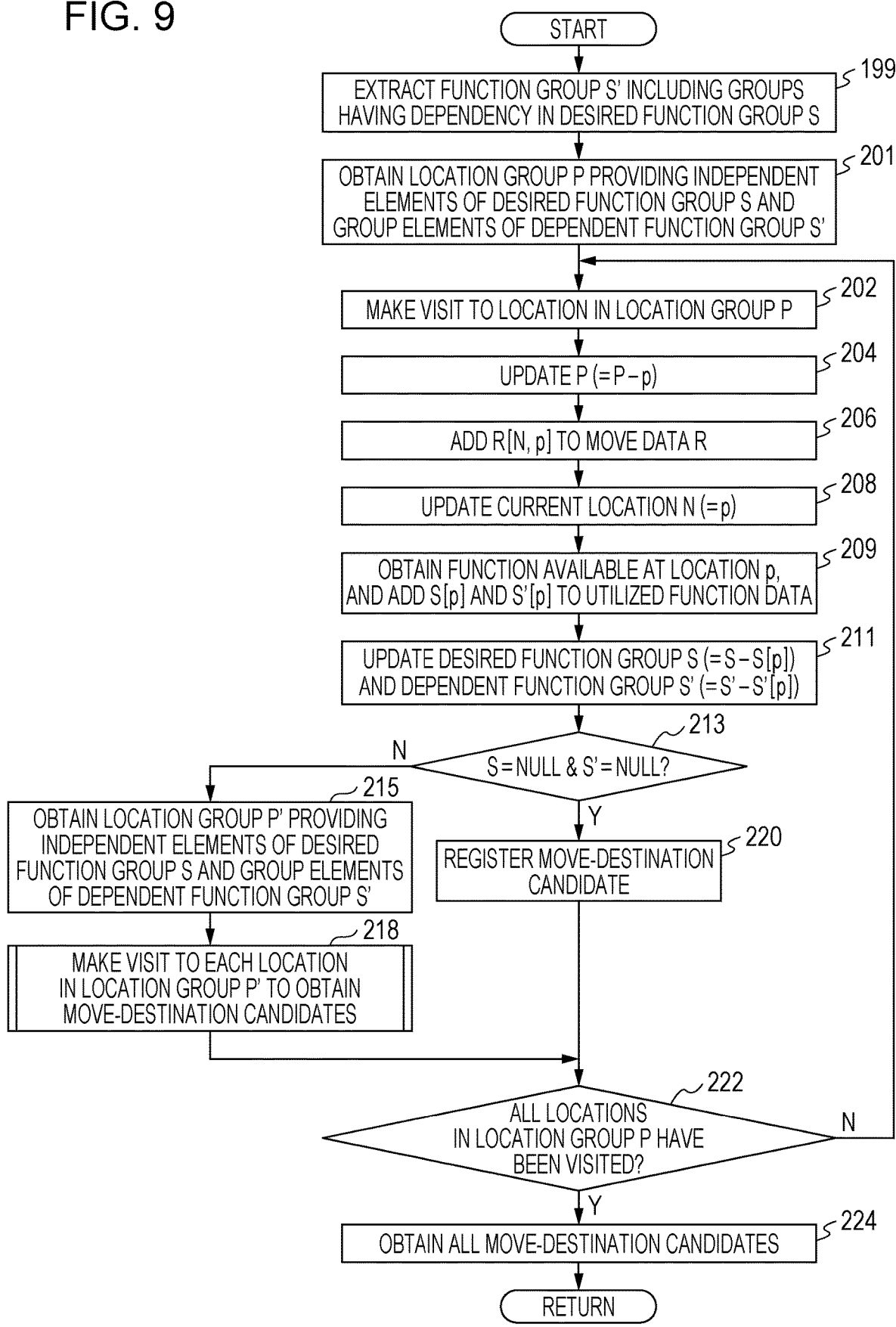
FIG. 9 is a flowchart of a modified exemplary process, which is performed by a web interface of a web server of an information presentation system, of obtaining move-destination candidates, each of which may cover all desired functions, according to an exemplary embodiment.

In the process in FIG. 5, the case in which some functions in the desired function group depend on each other is not considered. Therefore, move-destination candidates may be obtained by using a restriction condition that functions having dependency are regarded as a group and are provided at the same location. For example, the acquisition of move-destination candidates in step 106 described above may be performed by using the process in FIG. 9. FIG. 9 is a flowchart of a modified exemplary process, which is performed by the web interface 18 of the web server 12 of the information presentation system 10 according to the exemplary embodiment, of obtaining move-destination candidates, each of which may cover all the desired functions. A description will be made by designating the same processes as those in FIG. 5 with the same reference numerals.

That is, in step 199, the move-destination candidate acquiring unit 22 of the web interface 18 extracts, from the database 28, a dependent function group S' which includes groups having dependency in the desired function group S. Then, the process proceeds to step 201.

In step 201, the move-destination candidate acquiring unit 22 of the web interface 18 obtains, through searching the database 28, a location group P that provides the independent elements of the desired function group S and the group elements of the dependent function group S'. Then, the process proceeds to step 202. That is, the database 28 is searched for a location group P of function providing locations, which may provide the functions of the desired function group S in the area (for example, within the radius R) predetermined with respect to the current location, in consideration of the dependency in the functions, and the location group P is obtained.

In step 202, the move-destination candidate acquiring unit 22 of the web interface 18 makes a visit to a location of the obtained location group P, and the process proceeds to step 204.

In step 204, the move-destination candidate acquiring unit 22 of the web interface 18 updates the location group P (=P−p), and the process proceeds to step 206. That is, the visited location is excluded from the location group P.

In step 206, the move-destination candidate acquiring unit 22 of the web interface 18 adds R[N, p] indicating a move from N to p to the move data R, and the process proceeds to step 208.

In step 208, the move-destination candidate acquiring unit 22 of the web interface 18 updates the current location N (=p), and the process proceeds to step 209. That is, the current location is updated with the move destination p.

In step 209, the move-destination candidate acquiring unit 22 of the web interface 18 obtains, from the database 28, the function(s) available at the location p, and adds S[p] and S'[p] to the utilized function data. Then, the process proceeds to step 211.

In step 211, the move-destination candidate acquiring unit 22 of the web interface 18 updates the desired function group S (=S−S[p]) and the dependent function group S' (=S'−S'[p]). Then, the process proceeds to step 213. That is, the added utilized functions S[p] and S'[p] are excluded from the to-be-found targets that are to be used in the search.

In step 213, the move-destination candidate acquiring unit 22 of the web interface 18 determines whether or not all the elements of the desired function group S and the dependent function group S' have been found (S & S'=NULL). If the determination result is negative, the process proceeds to step 215. If the determination result is positive, the process proceeds to step 220.

In step 215, the move-destination candidate acquiring unit 22 of the web interface 18 obtains, from the database 28, a location group P' that provides the independent elements of the updated desired function group S and the group elements of the updated dependent function group S'. Then, the process proceeds to step 218.

In step 218, the move-destination candidate acquiring unit 22 of the web interface 18 makes a visit to each location of the remaining location group P' to obtain move-destination candidates. Then, the process proceeds to step 222. Processes similar to steps 202 to 215 described above are performed on the location group P'.

In contrast, in step 220, the move-destination candidate acquiring unit 22 of the web interface 18 registers the move-destination candidate, and the process proceeds to step 222.

In step 222, the move-destination candidate acquiring unit 22 of the web interface 18 determines whether or not all the locations in the location group P have been visited so as to obtain move sequences. If the determination result is negative, the process returns to step 202, and the above-described processes are repeatedly performed. If the determination result is positive, the process proceeds to step 224.

In step 224, the move-destination candidate acquiring unit 22 of the web interface 18 obtains all the move-destination candidates. The series of processes end, and the process returns to step 108 in FIG. 3.

Figure 10:
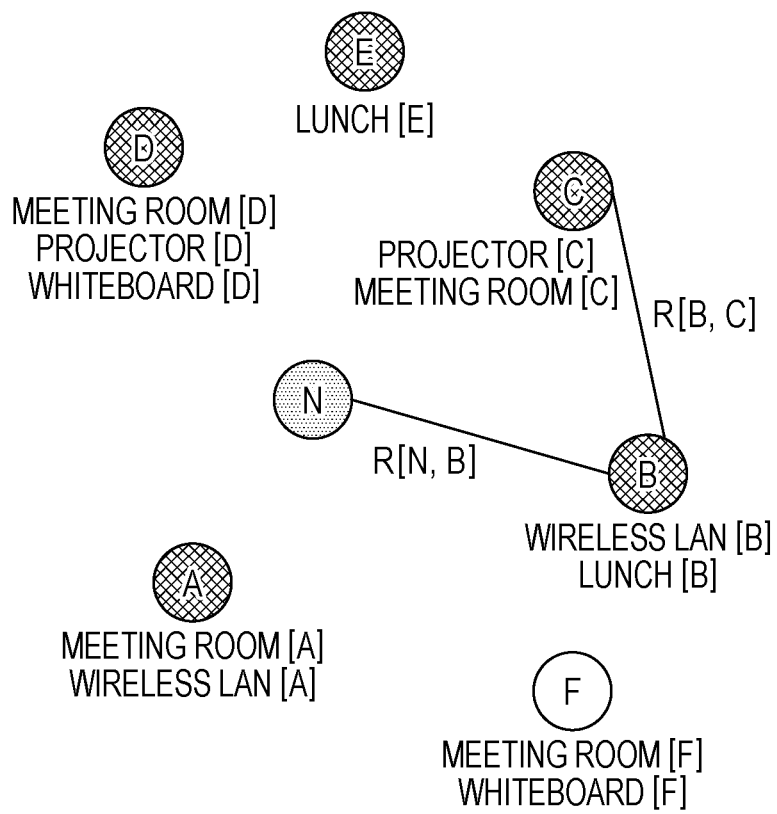
FIG. 10 is a diagram illustrating an example in which a location group P of function providing locations A, B, C, D, and E at which the functions of a desired function group S may be performed in consideration of dependency among the functions is obtained, and in which a move to the function providing location C is made after a move to the function providing location B.

The process of obtaining move-destination candidates in FIG. 9 will be described in detail by taking a concrete example. For example, as illustrated in FIG. 10, assume that the desired function group S is constituted by the wireless LAN function, the projector function, the meeting room function, and the lunch function.

In this case, the location group P of function providing locations A, B, C, D, and E which are present in the area (for example, within the radius R) predetermined with respect to the current location N and which may provide the functions of the desired function group S in consideration of dependency of the functions is obtained from the database 28. The dependent functions are determined, for example, by preparing in advance a dependent-function table for each function role. In the example in FIG. 10, the function providing locations A, B, and E do not provide any group element of the dependent function group, but provides an element(s) of the independent function group. The function providing locations C and D do not provide an element of the independent function group, but provide a group element of the dependent function group.

At that time, for example, assume that a move to the function providing location B is first made. The move to the function providing location B leads to updating the location group P, and the function providing locations A, C, D, and E constitute the remaining location group P.

Since the move from the current location N to the function providing location B is made, R[N, B] indicating a move from the current location to the function providing location B is added.

The move to the function providing location B leads to addition of the wireless LAN [B] and the lunch [B] as the utilized function S[p]. Thus, the desired function group S and the dependent function group S' are updated. Accordingly, no elements of the independent function group are present (S=NULL), and the group element (group[projector, meeting room]) of the dependent function group S' is present.

Then, the location group P' which provides the group element of the dependent function group S' is searched for, and the location group P' is constituted by the function providing locations C and D. The locations of the location group P' are to be visited. For example, a move from the function processing unit B to the function processing unit C is made, and the location group P' is updated. Then, the function providing location D constitutes the remaining location group P'.

Since the current location is moved from the function providing location B to the function providing location C, R[B, C] indicating a move from the function providing location B to the function providing location C is added. Thus, the move data is constituted by R[N, B] and R[B, C].

The move to the function providing location C leads to addition of the projector [C] and the meeting room [C], which constitute the group element, as the utilized function S'[p]. Thus, all the functions of the desired function group S may be performed. Therefore, the desired function group S and the dependent function group S' are updated, and the remaining desired function group S and the remaining dependent function group S' are not present (NULL). The determination result in step 213 is positive, and the move R[N, B] and the move R[B, C] are registered as the move-destination candidate 1.

Similar processes are performed, and all the elements of the location group P and the location group P' providing group elements are visited. All of the move-destination candidates are obtained.

Figure 11:
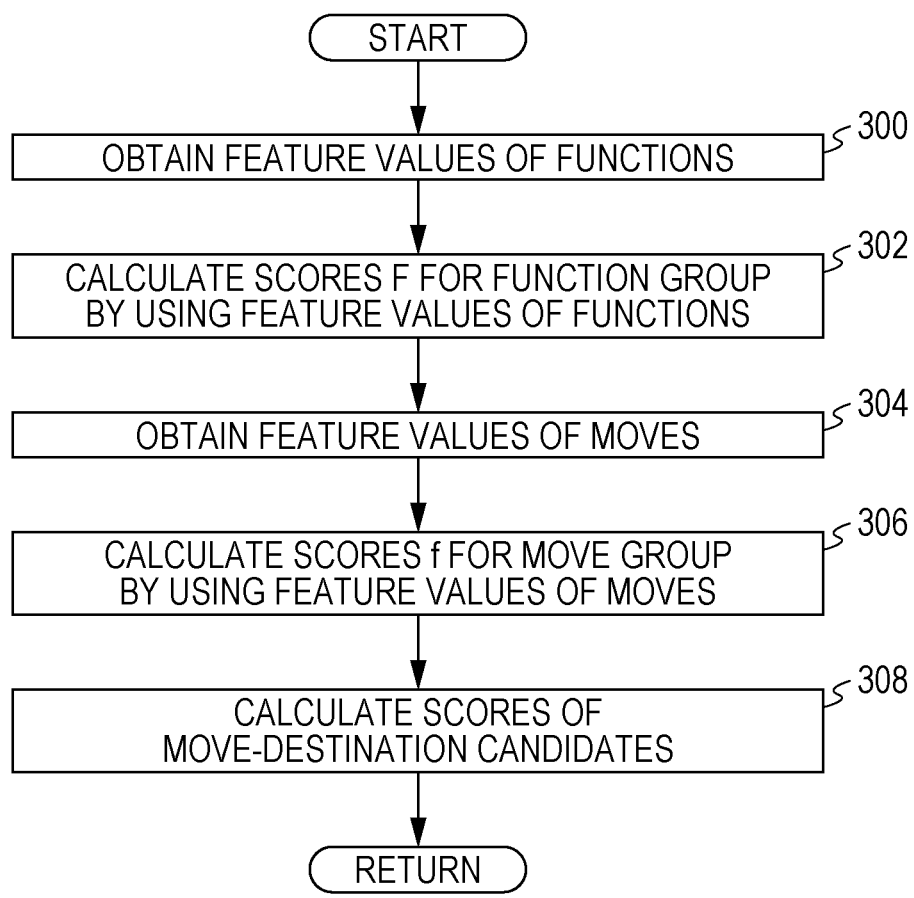
FIG. 11 is a flowchart of an exemplary process of calculating scores A1 of move-destination candidates.

The process of calculating the scores A1 of the move-destination candidates in step 108 described above will be described in detail. FIG. 11 is a flowchart of an exemplary process of calculating the scores A1 of the move-destination candidates.

In step 300, the move-destination candidate score calculating unit 24 of the web interface 18 obtains the feature values of the functions from the database 28, and the process proceeds to step 302. Specifically, function feature-value tables illustrated in FIG. 12 are stored in advance in the database 28, and the feature values of the functions are obtained. In the function feature-value tables, for each of functions S1, S2, . . . , Sn, locations (function providing locations A, B, C, etc.) which may provide the function are predetermined. In addition, the feature values (F1 to Fn) are predetermined for each function providing location. In the example in FIG. 12, examples include a fee, reliability, a quantity, and an area. Each feature value converted as a number is predetermined.

In step 302, the move-destination candidate score calculating unit 24 of the web interface 18 calculates the scores F for the function group by using the feature values of the functions. Then, the process proceeds to step 304. For example, the total (F_SUM) of the feature values obtained through conversion into numbers is calculated. At that time, the total may be calculated by weighting the features. For example, as illustrated in FIG. 13B, the weight values are predetermined for the features (F1 to Fn) and stored in the database 28. The corresponding weight values are read and multiplied by the feature values, and the total of the feature values is calculated. In order that comparison with the feature values of the moves is performed in a process described below, the feature values as numbers are converted, for normalization, into numbers between 0 and 1. For example, a larger feature value indicates a better state. The scores F for the function group are calculated, for example, by using the expression illustrated in FIG. 12. The value of $W(F_k)$ in the expression in FIG. 12 is determined by referring to the feature weight table in FIG. 13B. The $F_k$ value is converted, for normalization, into a number between 0 and 1 by using a feature-value conversion table.

In step 304, the move-destination candidate score calculating unit 24 of the web interface 18 obtains the feature values of the moves, and the process proceeds to step 306. Specifically, the move feature-value table illustrated in FIG. 13A is stored in advance in the database 28, and the feature values of the moves are obtained. The move feature-value table is predetermined, for example, by converting the features (such as the distance, the congestion factor, the number of stairs, and the time) of each move path into numbers.

In step 306, the move-destination candidate score calculating unit 24 of the web interface 18 calculates the scores f for the move group by using the feature values of the moves, and the process proceeds to step 308. For example, the total (f_SUM) of the feature values obtained through conversion into numbers is calculated. At that time, the total may be calculated by weighting the features. For example, as illustrated in FIG. 13B, the weight values are predetermined for the features (f1 to fn) and stored in the database 28. The corresponding weights are read and multiplied by the feature values, and the total of the feature values is calculated. In conversion of the feature values of a move into numbers, for example, the feature-value conversion table illustrated in FIG. 13C is used to perform normalization. In the conversion table in FIG. 13C, the feature values of a move are converted into numbers between 0 and 1. A smaller feature value indicates that the state noticeably becomes worse. The scores f for the move group are calculated, for example, by using the expression illustrated in FIG. 13A. The value of $W(f_k)$ in the expression in FIG. 13A is determined by referring to the feature weight table illustrated in FIG. 13B. The $f_k$ value is converted, for normalization, into a number between 0 and 1 by using a feature-value conversion table as illustrated in FIG. 13C.

In step 308, the move-destination candidate score calculating unit 24 of the web interface 18 calculates the scores of the move-destination candidates. The series of processes end, and the process returns to step 110 in FIG. 3.

Figure 14:
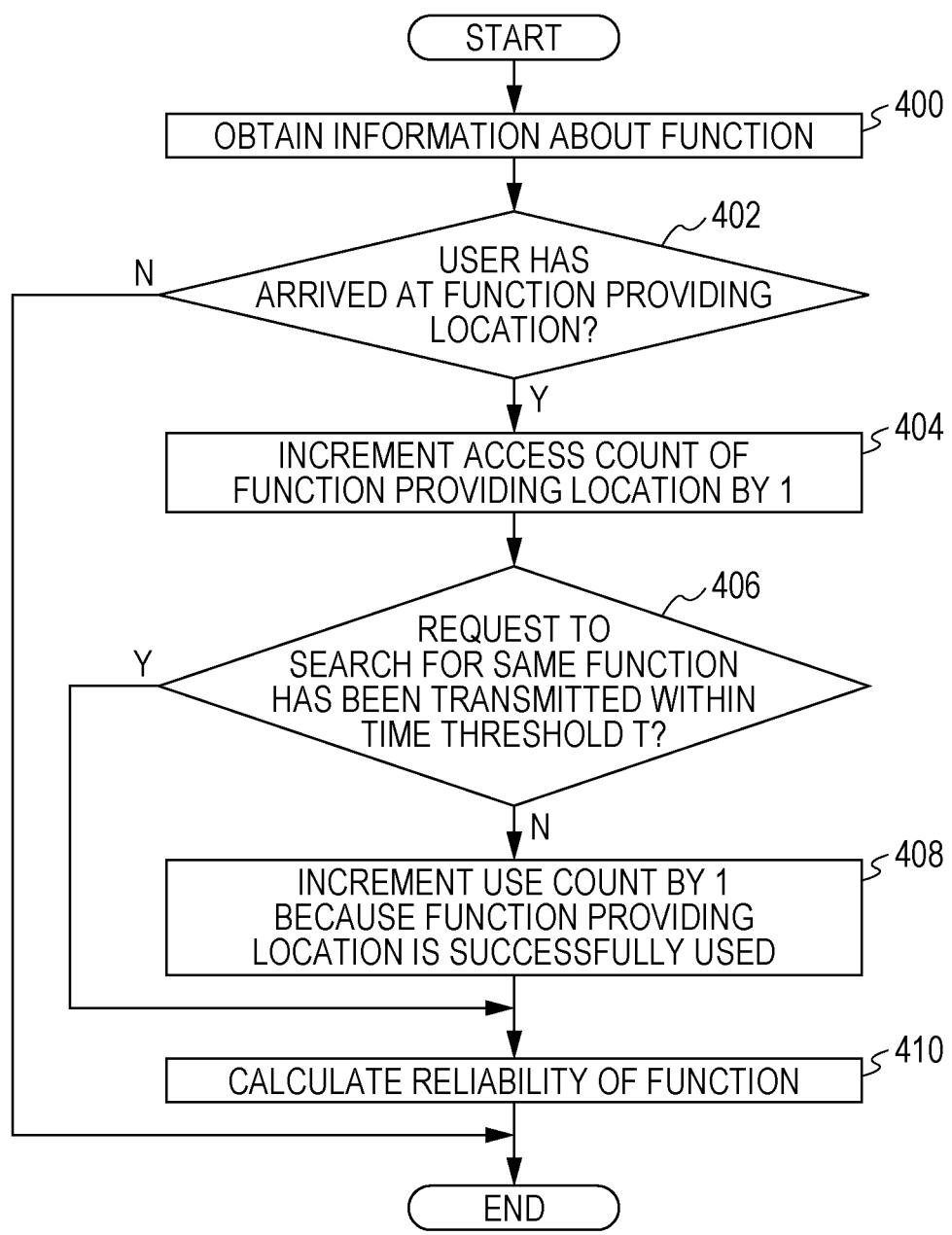
FIG. 14 is a flowchart of an exemplary process of calculating a reliability.

As a feature value of a function, as illustrated in FIG. 12, "reliability" is taken as an example. An exemplary method of calculating the reliability will be described below. FIG. 14 is a flowchart of an exemplary process of calculating the reliability. The process in FIG. 14 starts in the case where, after a user operates the input unit 34 of the terminal apparatus 14 so as to input the to-be-performed function group, information about the input function group is transmitted to the web server 12 so that the web server 12 is requested to search for move-destination candidates.

In step 400, the move-destination candidate score calculating unit 24 of the web interface 18 obtains information about a function, and the process proceeds to step 402. As the information about a function, for example, the access count and the use count of a function providing location are obtained.

In step 402, the move-destination candidate score calculating unit 24 of the web interface 18 determines whether or not the user has arrived at the function providing location which provides the presented function. The determination is made on the basis of the position information measured by using a positioning function in the case where the terminal apparatus 14 is provided with the positioning function. In the case where the terminal apparatus 14 is not provided with the positioning function, the determination may be made by using authentication information or the like used when the user is to use the function providing location. If the determination result is positive, the process proceeds to step 404. If the determination result is negative, the series of processes end.

In step 404, the move-destination candidate score calculating unit 24 of the web interface 18 increments, by 1 (+1), the access count of the function providing location, and the process proceeds to step 406.

In step 406, the move-destination candidate score calculating unit 24 of the web interface 18 determines whether or not a request to search for the same function has been transmitted within a predetermined time threshold T. That is, when the user requests the web server 12 to search for the same function, it is determined that the search result is not appropriate. Therefore, this determination is made. If the determination result is negative, the process proceeds to step 408. If the determination result is positive, the process proceeds to step 410.

In step 408, the move-destination candidate score calculating unit 24 of the web interface 18 determines that the function providing location is successfully used, and increments the use count by 1 (+1). Then, the process proceeds to step 410.

In step 410, the move-destination candidate score calculating unit 24 of the web interface 18 divides the use count by the total access count so as to calculate the reliability. Thus, the reliability of the function is updated, and the series of processes end.

Figure 15:
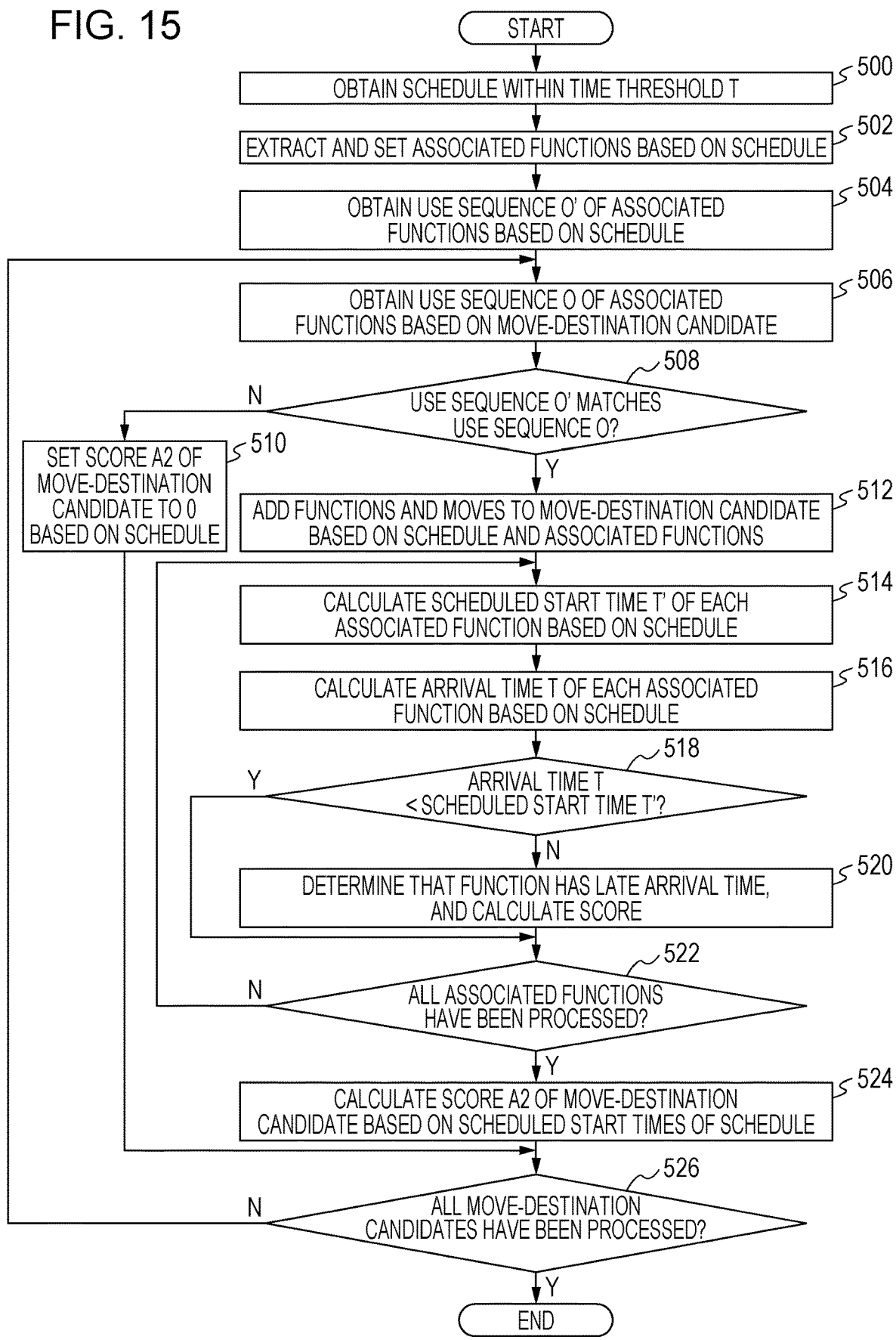
FIG. 15 is a flowchart of an exemplary process of obtaining move-destination candidates that match a schedule and calculating scores A2 of the move-destination candidates.

The process of obtaining move-destination candidates that match the schedule and calculating the scores A2 of the move-destination candidates in step 110 described above will be described in detail. FIG. 15 is a flowchart of an exemplary process of obtaining move-destination candidates that match a schedule and calculating the scores A2 of the move-destination candidates.

In step 500, the move-destination candidate score calculating unit 24 of the web interface 18 obtains the schedule within the predetermined time threshold T, and the process proceeds to step 502. For example, a schedule registered in advance in the terminal apparatus 14 of the user may be obtained. Alternatively, the user may register a schedule in the database 28 in advance. Thus, the schedule may be obtained by reading the schedule from the database 28.

In step 502, the move-destination candidate score calculating unit 24 of the web interface 18 extracts and sets associated functions on the basis of the schedule, and the process proceeds to step 504. That is, functions associated with the tasks included in the schedule are extracted, and correspondences are set. For example, a correspondence with an associated function (previous associated function) performed before a task, a correspondence with an associated function (synchronous associated function) performed in synchronization with a task, and a correspondence with an associated function (post-associated function) performed after a task are separately set.

In step 504, the move-destination candidate score calculating unit 24 of the web interface 18 obtains a use sequence O' of the associated functions based on the schedule, and the process proceeds to step 506.

In step 506, the move-destination candidate score calculating unit 24 of the web interface 18 obtains a use sequence O of the associated functions based on a move-destination candidate, and the process proceeds to step 508.

In step 508, the move-destination candidate score calculating unit 24 of the web interface 18 determines whether or not the use sequence O' matches the use sequence O. If the determination result is negative, the process proceeds to step 510. If the determination result is positive, the process proceeds to step 512.

In step 510, the move-destination candidate score calculating unit 24 of the web interface 18 sets the score A2 of the move-destination candidate to 0 on the basis of the schedule. Then, the process proceeds to step 526.

Figures 16A, 16B, 16C:
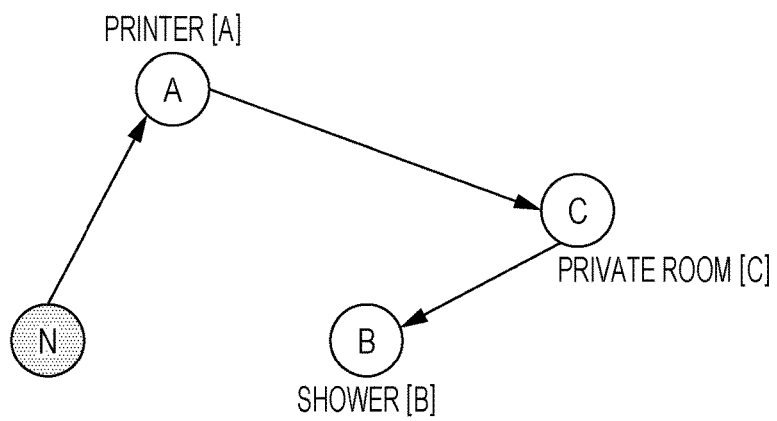
FIG. 16A is a diagram illustrating an exemplary schedule.
FIG. 16B is a diagram illustrating an example in which moves to function providing locations A, C, and B are made in this sequence, and in which the functions of the printer [A], the private room [C], and the shower [B] are used.
FIG. 16C is a diagram illustrating exemplary correspondences between the tasks in a schedule and their associated functions.

The processes in steps 500 to 510 will be described by taking an example. For example, assume that the desired function group S is constituted by the printer function, the private room function, and the shower function; the current location is N; the departure time is 12:30; and the schedule illustrated in FIG. 16A is set. In this case, in the above-described processes until step 110, the move-destination candidates and the scores A1 are obtained. Assume that an exemplary move-destination candidate is registered which indicates that, as illustrated in FIG. 16B, the functions of the printer [A], the private room [C], and the shower [B] are used with move (R[N, A], R[A, C], R[C, B]) which indicates moves to the function providing locations A, C, and B in this sequence. In this example, in step 502, functions associated to the tasks included in the schedule are extracted, and correspondences are set. Thus, the correspondences between the tasks and their associated functions are obtained as illustrated in FIG. 16C. That is, the following correspondences are obtained: a correspondence indicating that a previous associated function of the speech task is the printer [A]; a correspondence indicating that a synchronous associated function of the study task is the private room [C]; and a correspondence indicating that a post-associated function of the sports task is the shower [B]. In this case, in step 504, the use sequence O' of the associated functions based on the schedule is extracted. The use sequence O' of the printer [A], the private room [C], and the shower [B] is obtained. In step 506, the use sequence O of the associated functions based on the move-destination candidate is a sequence of the printer [A], the private room [C], and the shower [B]. In this example, in step 508, it is determined that both the use sequences match each other.

Figure 17:
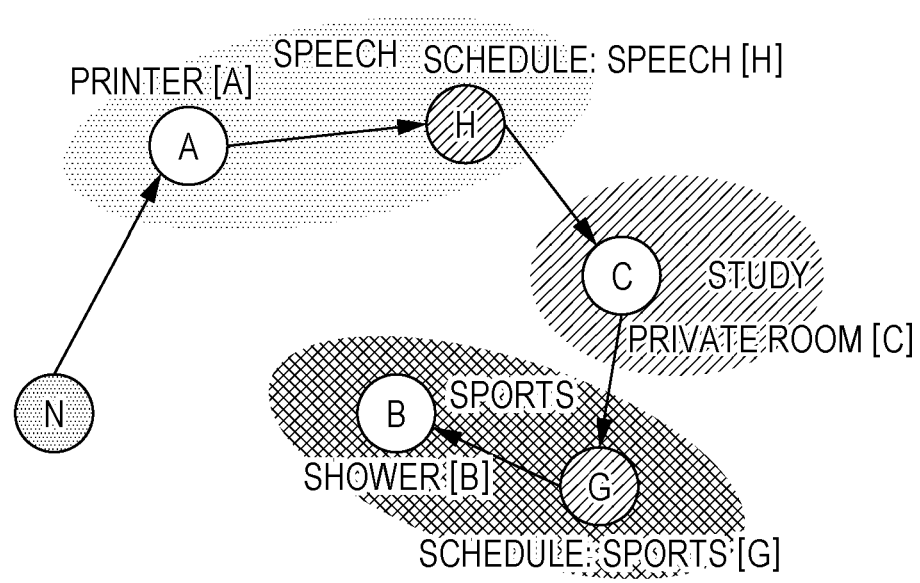
FIG. 17 is a diagram illustrating an example in which the speech [H] is added between the function providing location A and the function providing location C and in which the sports [G] is added between the function providing location C and the function providing location B.

Subsequently, in step 512, the move-destination candidate score calculating unit 24 of the web interface 18 adds functions and moves to the move-destination candidate on the basis of the schedule and the associated functions. Then, the process proceeds to step 514. That is, functions, moves, and the like that match the schedule are extracted as the move-destination candidate. For example, a description will be made by taking the above-described example illustrated in FIGS. 16 A to 16C. As described above, correspondences between the tasks in the schedule and the associated functions are obtained as illustrated in FIG. 16C. In this case, in step 512, on the basis of the destinations in the schedule and the associated functions, the functions and the moves are added. Then, as illustrated in FIG. 17, the speech [H] is added between the function providing location A and the function providing location C; and the sports [G] is added between the function providing location C and the function providing location B. After the addition, information is registered which indicates that the functions of the printer [A], the speech [H], the private room [C], the sports [G], and the shower [B] are used with move (R[N, A], R[A, H], R[H, C], R[C, G], R[G, B]) which indicates moves to function providing locations A, H, C, G, and B in this sequence. The way to add a function is that, for a previous associated function, a move from the function to the task is added. In the example described above, a move from the location of the function (the printer [A]) to the location of the task (the speech [H]) is added, and the move sequence is reconfigured. For a synchronous associated function, in the example described above, no addition is made. For a post-associated function, a move from the task location to the function is added. In the example described above, a move from the location of the task (the sports [G]) to the location of the function (the shower [B]) is added, and the move sequence is reconfigured. If no associated functions are present, no addition is made.

In step 514, the move-destination candidate score calculating unit 24 of the web interface 18 calculates the scheduled start time T' of an associated function of the associated functions on the basis of the schedule. Then, the process proceeds to step 516. For example, the inside/outside-of-room map route information 30 is obtained from a server providing a destination guide site or the like. Thus, travel times are obtained. In the above-described example in FIGS. 16A to 16C, an exemplary result of obtained travel times is illustrated in FIG. 18A. In FIG. 18A, the move R[N, A] takes 8 minutes; the move R[A, H] takes 10 minutes; the move R[H, C] takes 5 minutes; the move R[C, G] takes 12 minutes; and the move R[G, B] takes 7 minutes. In addition, the times in use of the functions are obtained. At that time, in the case of a synchronous associated function, as illustrated in FIG. 18B, the time in use is set to an execution time of the task corresponding to the associated function obtained from the schedule. For an associated function other than a synchronous associated function, for example, the time in use is set by employing the user's average time in use or a preset time. FIG. 18C is a diagram illustrating an example in which the time in use of the previous associated function and the time in use of the post-associated function are set. These times are used to calculate the scheduled start times T' of the associated functions. That is, for each of the scheduled start time T' of the previous associated function and the scheduled start time T' of the post-associated function, a time is calculated by subtracting, from the start time of the next task, the time in use of the function and the travel time to the next task location. Specifically, in the above-described example in FIGS. 16A to 17, the scheduled start time of the printer [A] is 12:40 which is a time obtained by subtracting, from 13:00 which is the start time of the next task, the speech [H], ten minutes of time in use and ten minutes of travel time to the next task location. In the case of no next tasks, a predetermined default time is set. For example, the scheduled start time of the shower [B] is set to 24:00 which is the default time. In contrast, the scheduled start time T' of a synchronous associated function is set by employing the start time of the task. In the above-described example in FIGS. 16A to 17, the scheduled start time of the private room [C] is set to 15:00. FIG. 18D illustrates an example in which the scheduled start times T' are set.

Subsequently, in step 516, the move-destination candidate score calculating unit 24 of the web interface 18 calculates the arrival time T at the associated function location on the basis of the schedule. Then, the process proceeds to step 518. For example, the travel time to the function location is added to the end time of the previous task. In the case of no previous tasks, the travel time from the current location to the function location is added to the start time. For example, in the above-described example in FIGS. 16A to 17, the printer [A] has no previous tasks, and the start time from the current location N is 12:30. Therefore, in calculation of the earliest arrival time at the printer [A] location, the travel time of R[N, A] is added to the start time, and, as illustrated in FIG. 18E, the arrival time is 12:38. The previous task of the private room [C] is a speech. In calculation of the earliest arrival time at the private room [C] location, the travel time of R[H, C] is added to the end time, 14:00, of the speech, and the arrival time is 14:05. Similarly, other arrival times are calculated. As illustrated in FIG. 18E, the arrival time at the shower [B] location is 18:37; the arrival time at the speech [H] location is 12:58; and the arrival time at the sports [G] location is 16:12.

In step 518, the move-destination candidate score calculating unit 24 of the web interface 18 compares the arrival time T with the scheduled start time T', and determines whether or not the arrival time T<the scheduled start time T'. That is, the move-destination candidate score calculating unit 24 determines whether or not the arrival time is before the scheduled start time T'. If the determination result is negative, the process proceeds to step 520. If the determination result is positive, the process proceeds to step 522.

In step 520, the move-destination candidate score calculating unit 24 of the web interface 18 determines that the function has a late arrival time, and calculates the score of the function. Then, the process proceeds to step 522. For example, in calculation of the score of the function having a late arrival time, similarly to the calculation of a score A1 in step 108 described above, the score of the function having a late arrival time is calculated.

In step 522, the move-destination candidate score calculating unit 24 of the web interface 18 determines whether or not all of the associated functions have been processed. If the determination result is negative, the process returns to step 514, and the above-described processes in steps 514 to 520 are repeatedly performed until all of the associated functions have been processed. If the determination result is positive, the process proceeds to step 524.

In step 524, the move-destination candidate score calculating unit 24 of the web interface 18 calculates the score A2 of the move-destination candidate on the basis of the scheduled start times for the schedule. Then, the process proceeds to step 526. Specifically, the score A2 is calculated by subtracting, from the score A1 calculated in step 108 described above, the scores, which are calculated in step 520, of the functions having late arrival times. In the above-described example in FIGS. 18A to 18E, no functions having late arrival times are present, and A2=A1.

In step 526, the move-destination candidate score calculating unit 24 of the web interface 18 determines whether or not the scores A2 of all of the move-destination candidates have been calculated. If the determination result is negative, the process proceeds to step 506, and the above-described processes are repeatedly performed. When the determination result is positive, the process of calculating the scores A2 ends.

In the above-described exemplary embodiment, the example is described in which, by using the feature values of functions and the features values of moves, the scores of move-destination candidates are calculated for presentation of the move-destination candidates. However, this is not limiting. For example, by using the feature values of functions or the feature values of moves, the scores of move-destination candidates may be calculated for presentation of the move-destination candidates.

In the above-described exemplary embodiment, the example is described in which the overall score A of a move-destination candidate is calculated by adding the score A1 to the score A2. However, this is not limiting. For example, the score A1 or the score A2 may be set to the overall score A of a move-destination candidate.

The processes (in FIGS. 3, 5, 9, 11, 14, and 15) performed by the web interface 18 of the information presentation system 10 according to the above-described exemplary embodiment may be performed through software, may be performed through hardware, or may be performed in combination of software and hardware. The processes performed by the apparatuses of the information presentation system 10 may be distributed as a program by storing the program in a storage medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information presentation apparatus comprising:
a processor programmed to:
acquire information about a function group desired by a user, the function group including at least a first function and a second function different from the first function;
acquire a predetermined action plan of the user; and
present, on a display, at least one candidate including:
a first location capable of providing the first function;
a second location capable of providing the second function, the first and second locations being among a plurality of function providing locations that are present within a predetermined area with respect to a current position of the user; and
a move sequence of the user from the current position to one of the first and second locations, and then to the other of the first and second locations,
wherein:
the at least one candidate is selected based on a position of the user and a time during which the user stays at the position, the position of the user being indicated by the predetermined action plan;
at least one of feature values is converted into a first number, the feature values including a feature value of at least one of the first and second locations and a feature value of the move sequence;
a match factor is converted into a second number so as to rank the at least one candidate for presentation, the match factor being determined for the predetermined action plan; and
the match factor is calculated by subtracting a first total of one or more feature values relating to the first function from a second total of one or more feature values relating to the second function, the first function having a late arrival time with respect to the predetermined action plan, the second function having an early arrival time with respect to the predetermined action plan.

2. The information presentation apparatus according to claim 1, wherein the processor is programmed to:
present, on the display, the at least one candidate with each respective rank.

3. The information presentation apparatus according to claim 1, wherein the feature value of the at least one of the first and second locations indicates reliability of the at least one of the first and second locations.

4. The information presentation apparatus according to claim 1, wherein the processor is programmed to:
use both of the first and second numbers to rank the at least one candidate for presentation.

5. The information presentation apparatus according to claim 1, wherein:
the at least one candidate includes a plurality of candidates; and
the processor is programmed to:
present candidates, among the plurality of candidates, which are top-ranked based on a rank number determined for each of the plurality of candidates.

6. The information presentation apparatus according to claim 1, wherein the processor is programmed to:
when the first and second functions have dependency, select the at least one candidate for presentation by regarding the first and second functions as one group.

7. An information presentation system comprising:
the information presentation apparatus according to claim 1; and
a terminal apparatus that includes an input unit for inputting the function group desired by the user, and that transmits an input result to the information presentation apparatus, the input result being obtained from the input unit.

8. A non-transitory computer readable medium storing a program for information presentation, the program causing a computer to execute a process, the process comprising:
acquiring information about a function group desired by a user, the function group including at least a first function and a second function different from the first function;
acquiring a predetermined action plan of the user; and
presenting, on a display, at least one candidate including:
a first location capable of providing the first function;
a second location capable of providing the second function, the first and second locations being among a plurality of function providing locations that are present within a predetermined area with respect to a current position of the user; and
a move sequence of the user from the current position to one of the first and second locations, and then to the other of the first and second locations,
wherein:
the at least one candidate is selected based on a position of the user and a time during which the user stays at the position, the position of the user being indicated by the predetermined action plan;
at least one of feature values is converted into a first number, the feature values including a feature value of at least one of the first and second locations and a feature value of the move sequence;
a match factor is converted into a second number so as to rank the at least one candidate for presentation, the match factor being determined for the predetermined action plan; and
the match factor is calculated by subtracting a first total of one or more feature values relating to the first function from a second total of one or more feature values relating to the second function, the first function having a late arrival time with respect to the predetermined action plan, the second function having an early arrival time with respect to the predetermined action plan.

9. The non-transitory computer readable medium according to claim 8, wherein the process comprises presenting, on the display, the at least one candidate with each respective rank.

10. The non-transitory computer readable medium according to claim 8, wherein the feature value of the at least one of the first and second locations indicates reliability of the at least one of the first and second locations.

11. The non-transitory computer readable medium according to claim 8, wherein the first and second numbers are both used to rank the at least one candidate for presentation.

12. The non-transitory computer readable medium according to claim 8, wherein:
the at least one candidate includes a plurality of candidates; and
the process comprises presenting candidates, among the plurality of candidates, which are top-ranked based on a rank number determined for each of the plurality of candidates.

13. The non-transitory computer readable medium according to claim 8, wherein the process comprises
when the first and second functions have dependency, selecting the at least one candidate for presentation by regarding the first and second functions as one group.

14. A method for information presentation, comprising:
acquiring information about a function group desired by a user, the function group including at least a first function and a second function different from the first function;
acquiring a predetermined action plan of the user; and
presenting, on a display, at least one candidate including:
a first location capable of providing the first function;
a second location capable of providing the second function, the first and second locations being among a plurality of function providing locations that are present within a predetermined area with respect to a current position of the user; and
a move sequence of the user from the current position to one of the first and second locations, and then to the other of the first and second locations,
wherein:
the at least one candidate is selected based on a position of the user and a time during which the user stays at the position, the position of the user being indicated by the predetermined action plan;
at least one of feature values is converted into a first number, the feature values including a feature value of at least one of the first and second locations and a feature value of the move sequence;
a match factor is converted into a second number so as to rank the at least one candidate for presentation, the match factor being determined for the predetermined action plan; and
the match factor is calculated by subtracting a first total of one or more feature values relating to the first function from a second total of one or more feature values relating to the second function, the first function having a late arrival time with respect to the predetermined action plan, the second function having an early arrival time with respect to the predetermined action plan.

15. The method according to claim 14, comprising
presenting, on the display, the at least one candidate with each respective rank.

16. The method according to claim 14, wherein the feature value of the at least one of the first and second locations indicates reliability of the at least one of the first and second locations.

17. The method according to claim 14, wherein the first and second numbers are both used to rank the at least one candidate for presentation.

18. The method according to claim 14, wherein:
the at least one candidate includes a plurality of candidates; and
the method comprises presenting candidates, among the plurality of candidates, which are top-ranked based on a rank number determined for each of the plurality of candidates.

19. The method according to claim 14, comprising
when the first and second functions have dependency, selecting the at least one candidate for presentation by regarding the first and second functions as one group.

* * * * *